(12) United States Patent
Schultz (10) Patent No.: US 8,165,728 B2
(45) Date of Patent: Apr. 24, 2012

(54) METHOD AND SYSTEM FOR PROVIDING A GPS-BASED POSITION

(75) Inventor: Abraham Schultz, Alexandria, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 891 days.

(21) Appl. No.: 12/193,985

(22) Filed: Aug. 19, 2008

(65) Prior Publication Data
US 2010/0049376 A1 Feb. 25, 2010

(51) Int. Cl.
*G05D 3/00* (2006.01)

(52) U.S. Cl. ............ 701/2; 701/23; 701/29.3; 701/32.3; 701/32.4; 701/469; 701/471; 701/473; 701/475; 701/482; 701/489; 701/500; 701/501; 701/512; 701/300; 701/301; 342/25 R; 342/29; 342/107; 342/118

(58) Field of Classification Search ................ 701/1–14, 701/23, 200–225, 300–302; 342/350–357.52; 340/988–996
See application file for complete search history.

(56) References Cited

U.S. PATENT DOCUMENTS

| | | | | |
|---|---|---|---|---|
| 5,043,903 A * | 8/1991 | Constant | | 701/300 |
| 5,493,309 A * | 2/1996 | Bjornholt | | 342/455 |
| 5,596,332 A * | 1/1997 | Coles et al. | | 342/455 |
| 6,072,433 A * | 6/2000 | Young et al. | | 342/386 |
| 6,122,572 A * | 9/2000 | Yavnai | | 701/23 |
| 6,271,768 B1 * | 8/2001 | Frazier et al. | | 340/961 |
| 6,321,147 B1 * | 11/2001 | Takeda et al. | | 701/23 |
| 6,459,411 B2 * | 10/2002 | Frazier et al. | | 342/455 |
| 6,483,454 B1 * | 11/2002 | Torre et al. | | 342/30 |
| 6,535,816 B1 * | 3/2003 | Smith | | 701/470 |
| 6,859,729 B2 * | 2/2005 | Breakfield et al. | | 701/2 |
| 6,963,795 B2 * | 11/2005 | Haissig et al. | | 701/7 |
| 7,024,309 B2 * | 4/2006 | Doane | | 701/301 |
| 7,272,472 B1 * | 9/2007 | McElreath | | 701/3 |
| RE40,801 E * | 6/2009 | Smith | | 701/470 |
| 7,636,619 B2 * | 12/2009 | Winkler et al. | | 701/14 |
| 7,769,502 B2 * | 8/2010 | Herman | | 701/6 |
| 7,894,948 B2 * | 2/2011 | Stroud | | 701/3 |
| 2002/0035419 A1 * | 3/2002 | Lin | | 701/27 |
| 2002/0147542 A1 * | 10/2002 | Tomescu | | 701/120 |
| 2002/0154061 A1 * | 10/2002 | Frazier et al. | | 342/455 |
| 2002/0165645 A1 * | 11/2002 | Kageyama | | 701/1 |
| 2005/0055143 A1 * | 3/2005 | Doane | | 701/30 |
| 2005/0096844 A1 * | 5/2005 | Pasturel et al. | | 701/214 |
| 2006/0114324 A1 | 6/2006 | Farmer et al. | | |
| 2006/0167622 A1 * | 7/2006 | Bodin et al. | | 701/206 |
| 2006/0195262 A1 * | 8/2006 | Draganov | | 701/214 |
| 2007/0132638 A1 * | 6/2007 | Frazier et al. | | 342/455 |
| 2007/0168117 A1 | 7/2007 | Howard et al. | | |
| 2008/0071431 A1 * | 3/2008 | Dockter et al. | | 701/3 |

(Continued)

*Primary Examiner* — Jonathan M Dager
(74) *Attorney, Agent, or Firm* — Amy L. Ressing; L. George Legg (57) ABSTRACT

A cooperative engagement group-position determining system employs a group of at least three cooperative units, for example a group of unmanned aerial vehicles (UAV's), with each unit including a GPS system for determining a GPS-based position, an inter-distance measurement module for measuring a distance of the unit relative to at least one other unit, and a computer having a computer-readable storage medium encoded with a program algorithm for correcting the GPS-based position based on at least one relative distance between two units, providing an improved GPS-based position for the unit and for the group. The system can also include a ground controller, for example, for providing flight control for UAV's.

11 Claims, 4 Drawing Sheets

U.S. PATENT DOCUMENTS

| | | | |
|---|---|---|---|
| 2008/0077284 A1* | 3/2008 | Swope | 701/5 |
| 2008/0093498 A1* | 4/2008 | Leal et al. | 244/3.2 |
| 2008/0117098 A1* | 5/2008 | Johnson et al. | 342/25 F |
| 2009/0021423 A1* | 1/2009 | Cheng et al. | 342/25 A |
| 2009/0030566 A1* | 1/2009 | Bodin et al. | 701/5 |
| 2009/0093959 A1* | 4/2009 | Scherzinger et al. | 701/215 |
| 2009/0102705 A1* | 4/2009 | Obermeyer | 342/25 F |
| 2009/0125163 A1* | 5/2009 | Duggan et al. | 701/2 |
| 2009/0138138 A1* | 5/2009 | Ferren et al. | 701/3 |
| 2009/0278736 A1* | 11/2009 | Cohen et al. | 342/357.08 |
| 2010/0169001 A1* | 7/2010 | Scherzinger et al. | 701/206 |
| 2011/0004402 A1* | 1/2011 | Fouet et al. | 701/207 |
| 2011/0130913 A1* | 6/2011 | Duggan et al. | 701/23 |

* cited by examiner

METHOD AND SYSTEM FOR PROVIDING A GPS-BASED POSITION

FIELD OF THE INVENTION

The invention is directed toward improving the positional accuracy generated by GPS. The invention accomplishes this by fusing the positional information generated by GPS on a specified cluster of units such as unmanned aerial vehicles and the set of internal inter-distance measurements between the units of this cluster. This fusion of these two dissimilar sensor types can generate more accurate positional information than provided by GPS alone.

BACKGROUND OF THE INVENTION

The positional errors associated with GPS are typically on the order of meters. There are applications that require more accurate location information for a cluster of units that interact cooperatively. An example is the construction of super-resolved SAR imagary obtainable from a cluster of unmanned aerial vehicles (UAV's) that exchange radar data. If the units in the cluster transmit timed radio/radar pulses to each other, then with sufficiently accurate clocks it is possible to generate a set of inter-distance measurements with smaller absolute errors than that of GPS. This matrix of inter-distance measurements merged with the approximate positional data of GPS will generate a more precise estimation of all units in the cluster.

BRIEF SUMMARY OF THE INVENTION

A cooperative engagement group-position determining system employs a group of at least three cooperative units, for example a group of unmanned aerial vehicles (UAV's), with each unit including a GPS system for determining a GPS-based position, an inter-distance measurement module for measuring a distance of the unit relative to at least one other unit, and a computer having a computer-readable storage medium encoded with a program algorithm for correcting the GPS-based position based on at least one relative distance between two units, providing an improved GPS-based position for the unit and for the group. The measurement module also includes the capability to measure the distance relative to each of the other units in the group. The system can also include a ground controller, for example, for providing flight control for UAV's.

The algorithm merges a matrix of distance measurements with the initial positional data obtained from GPS to generate more accurate positional data than provided by GPS alone. No such operational capability currently exists and there are diverse applications of this technique.

DETAILED DESCRIPTION OF THE INVENTION

Figure 1:
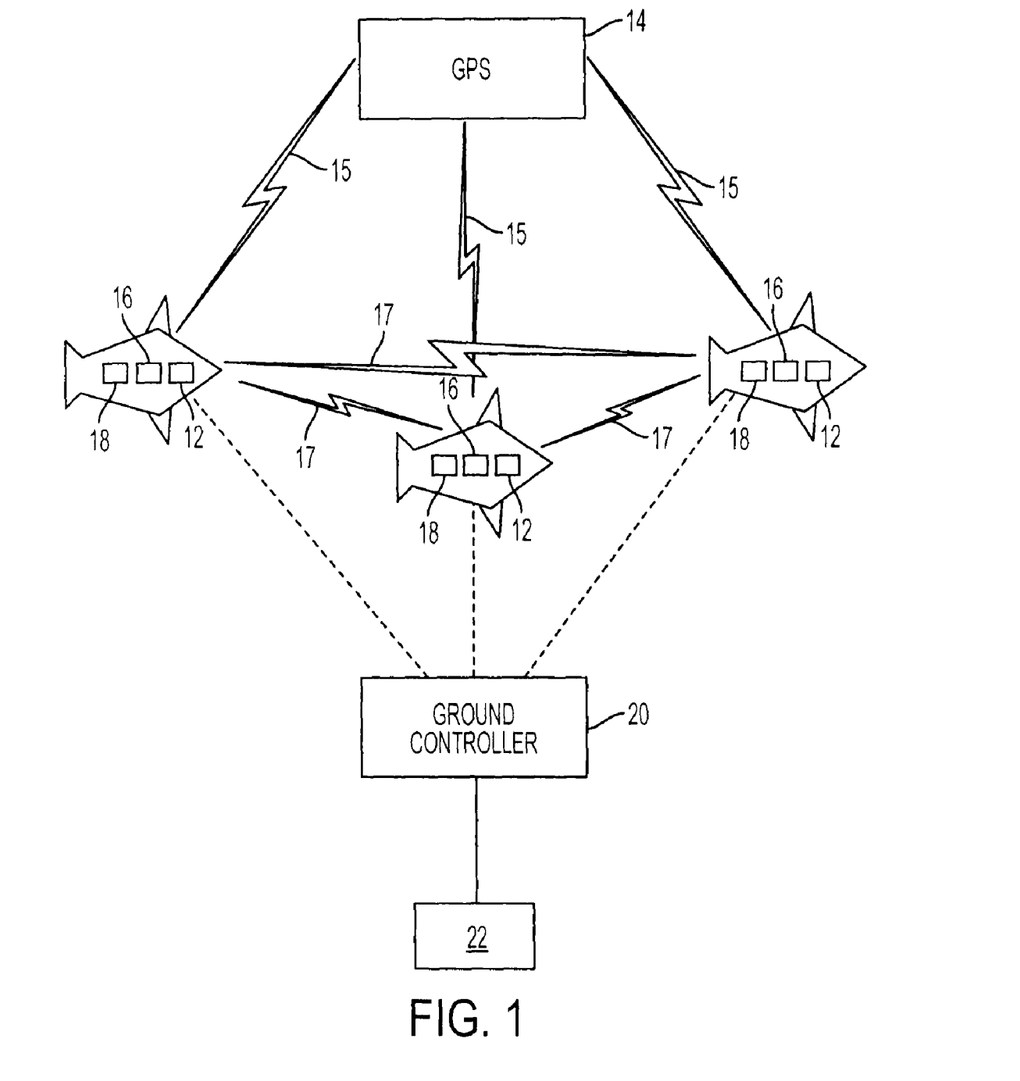
FIG. 1 is a GPS-based cooperative engagement group-position determining system according to the invention.

Referring now to FIG. 1, a cooperative engagement group-position determining system 10 includes a cluster or plurality of units 11, e.g. unmanned autonomous vehicles such as drones, each including an on-board GPS system 12, for linking with a satellite-based GPS system 14 via a GPS timing signal 15 to compute an individual GPS-based unit 11 position. Each unit 11 also includes an inter-distance measurement module 16 designed to measure the distance between that unit and all other units 11 in the cluster. One type of module 16 with this capability is a transmitter/receiver configured to link up with one or more of the other modules 16 and time a transmission-reception signal 17 cycle to thereby measure/compute the inter-distance, such as a pulsed EM link between units 11 interfaced with a processor-based clock or timing circuit in one or both units 11.

Figure 2:
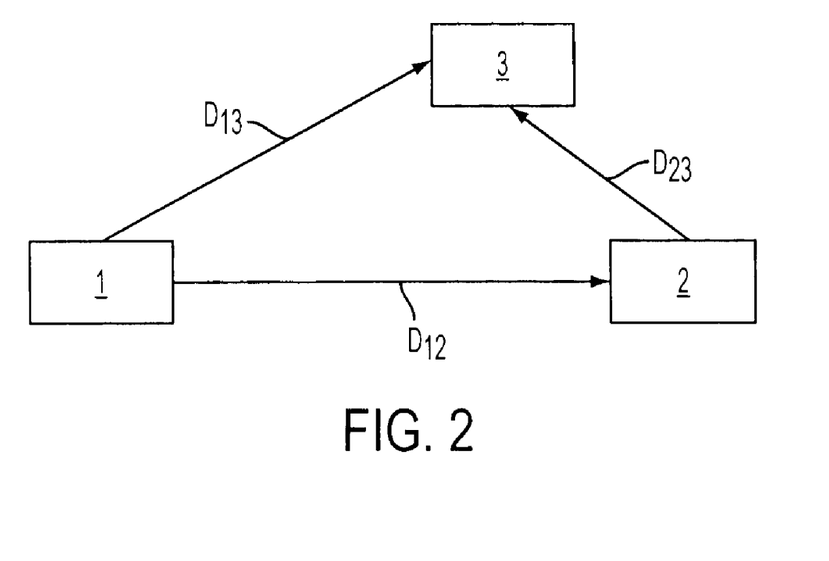
FIG. 2 is a schematic illustration of a cooperative engagement group's inter-unit communications according to the invention.

FIG. 2 shows a cooperative engagement group of three units 11. Unit 1 emits a pulsed EM signal at $t_1$ received by units 2 and 3 at times $t_{12}$ and $t_{13}$, respectively. The inter-distances are calculated as $$D_{12}=c(t_{12}-t_1) \text{ and}$$

$$D_{13}=c(t_{12}-t_1)$$

where c is the speed of light.

At time $t_2$ unit 2 emits a pulsed EM signal received by unit 3 at time $t_{23}$, where $$D_{23}=c(t_{23}-t_2).$$

Unit 1 may be termed the "lead unit" in the group, with its computer configured to calculate all the inter-distances between all units. System 10 can also include a protocol that shifts this lead unit configuration on the fly to another designated unit should a loss or failure occur with the initial lead unit 1. A typical application may require that the group operate in an autonomous mode, and that the computing and any such redesignation be automated without requiring outside-the-group control or input. Furthermore, given the speed of the signals and calculations as compared with the relatively much slower speed of the group units 11, the inter-distance measurements $D_{12}$, $D_{13}$, and $D_{23}$ are snapshots of a moving group or cluster. Each unit 11 in order to facilitate transmission/reception optionally includes an antenna (not illustrated) and other components as may be suitable for the particular application.

Other means for measuring the inter-distances are also within the scope of the invention. For example, another means for measuring/computing the inter-distance is employing a radar-type module 16 capable of timing a return echo radar signal to thereby compute the inter-distance to each radar "target" unit 11.

Each unit 11 also includes an on-board computer 18 including a computer-readable storage medium encoded with a program algorithm that includes instructions for applying the inter-distance measurement(s) to the GPS-based position for one or more of the units to thereby provide an improved GPS-based position for one or more of the units and for the group, as follows.

The algorithm consists of two parts. In Segment 1, an iterative process is applied to generate a set of position vectors for all the units 11 in the cluster such that the associated matrix of inter-distances are consistent with the observed set of inter-distance measurements. For an accurate set of inter-distance observations, the solution obtained by Segment 1 yields a set of positional data on all units in the cluster with the property that the associated inter-distance matrix is a close approximation to the inter-distance matrix for the actual ground truth positions of the units in the cluster. Thus the computed positions generated by Segment 1 is a "rigid body motion" of the unknown ground truth positions. In mathematics a rigid body motion of Euclidean space is called an isometry and it is known that each isometry of Euclidean space is composed of a sum of a rotation operator and a translation operator. The set of all isometries is called the Euclidean group.

In Segment 2 an inverse rigid body motion of the underlying space is applied to account for a net drift of the position vectors associated with the solution obtained by Segment 1. This rigid body motion is computed by minimizing over the Euclidean group the mean square error between the positions computed by Segment 1 and the original set of GPS positions. A representation of the Euclidean group without redundant parameters is developed in order to make the minimization process computational effective.

This final set of positions generated by Segment 2 will not coincide with the actual ground truth positions. There are several ways of measuring the error depending upon the application. One measure of error is just the sum of the distance errors between the estimated locations and the actual locations for all the units in the cluster. Since the computed locations of the units in the cluster generated by the algorithm is a rigid body motion of the actual ground truth locations, the error can be separated into a translational term and a rotational term. Depending on the application the translational error may not be significant. For some applications, one unit in the cluster can be selected as a "leader" and the translational error in effect disappears. It is also possible that one or more units in the cluster may have more accurate positional information and these units either provide a "reference frame" or a "reference point" for the final estimate of positions of all units in the cluster.

It should be noted that it is not necessary to have GPS positional data for all the units 11 in the cluster. In 2-dimensional space, if positional vectors are available for 3 or more non-collinear units in the cluster and inter-distance measurements are made for all units, then a simple algorithm will yield the position vectors for the remaining units. In 3-dimensional space, the corresponding problem will require positional vectors for 4 or more non-coplanar units 11 to determine the positions of the remaining units.

Representation of the Euclidean Group

The goal of Segment 2 is to eliminate the rigid body drift term associated with the solution obtained by Segment 1. This is implemented by minimizing over the Euclidean group the mean square error between the positions obtained by Segment 1 and the initial set of locations provided by GPS. There are standard minimization algorithms available and these are efficient when there are no redundant parameters in the objective function. In a space of two dimensions, a representation of the Euclidean group without redundant parameters is immediate. A computationally effective method for such a representation in three dimensional space is developed.

An isometry of a metric space is a transformation that preserves distances between all pairs of points and in Euclidean space an isometry is also called a rigid body motion. It is known that a rigid body motion is an inhomogeneous linear transformation that consists of a rotational term and a translational term. The translational term is just a vector in the space and the rotational term is an orthogonal linear transformation and is said to belong to the special orthogonal group SO(n) where n denotes the dimension of the underlying space. With T(n) denoting the transformation subgroup of translations, the dimensions of the Euclidean group E(n) for several values of n are given in Table 1, below.

TABLE 1

| n | T(n) | SO(n) | E(n) |
|---|------|-------|------|
| 1 | 1 | 0 | 1 |
| 2 | 2 | 1 | 3 |
| 3 | 3 | 3 | 6 |

The cases for n=2 and n=3 refer to units that are constrained to move in the plane or are free to move in 3 dimensional space. The n=1 case might not seem to be relevant but an example of this could occur when the units in the cluster are constrained to move along a road.

For n=1 the Euclidean group is just a translation along a line. For n=2 the translational part of a group element is a two dimensional vector and the rotational part is rotational matrix with one free parameter of the form $$R(\theta) = \begin{bmatrix} \cos(\theta) & -\sin(\theta) \\ \sin(\theta) & \cos(\theta) \end{bmatrix}$$

Let v=(a,b) be an arbitrary vector in the plane. Then a 3 dimensional representation of the Euclidean group without redundant parameters associates with the 3 numbers (θ,a,b) the linear transformation given by $$\begin{bmatrix} u \\ v \end{bmatrix} = R(\theta) \begin{bmatrix} x \\ y \end{bmatrix} + \begin{bmatrix} a \\ b \end{bmatrix}$$

For isometrics in 3-space, the translational part given by the vector v=(a,b,c) has no redundant parameters. A description of the rotational part of the transformation without redundant parameters is as follows.

Representation of the Rotation Group in 3-Space

For 3-space, the standard way to represent the rotation operator is by a 3 by 3 orthogonal matrix. This matrix has 9 elements of which only 3 are independent and there is no direct relationship between these matrix elements and the natural description of a rotation operator as a rotation of space around a given axis and through a given angle. The axis part of the description requires two parameters to determine its direction in 3-space and the angular rotation about this axis requires one parameter. In order to implement Segment 2 of the algorithm for the 3 dimensional case it is advantageous to employ 3 different representations of the rotation group.

The first representation is the geometric one with 3 free parameters that determine the axis of rotation and the magnitude of rotation about this axis. The second representation is via the algebra of quaternions. The third representation is via 3 by 3 orthogonal matrices. The matrix representation is needed for the actual implementations of rotation operators but in general they have 6 redundant parameters. The quaternions are used to provide a mapping between the direct representation and the group of orthogonal matrices. The group of matrices constructed in this way will have no redundant parameters and this will simplify the minimization part of the algorithm in that no side constraints have to be satisfied.

(1) Direct Representation of SO(3)

In this representation the rotation group SO(3) is described as a solid ball of radius π in a space of 3 dimensions. Let (u,v,w) be the Cartesian coordinates of a point in this space.

Then the axis of rotation associated with this point is given by the direction of the vector (u,v,w) relative to the origin and the magnitude of the rotation (measured counterclockwise) about this axis is given by the length of this vector and this has the value $[u^2+v^2+w^2]^{1/2}$.

(2) Representation of SO(3) via Quaternions

The 4 dimensional non-commutative division algebra of quaternions is denoted by Q and has the set of generators {1,i,j,k} with $$i^2=j^2=k^2=-1$$

and $$ij=k=-ji$$

$$jk=i=-kj$$

$$ki=j=-ik$$

An arbitrary element p of Q is given by $$p=p_0+p_1i+p_2j+p_3k$$

Multiplication is associative and distributive but is not commutative. The "complex conjugate" of p is defined by $$p=p_0-p_1i-p_2j-p_3k$$

A quaternion is said to be pure if $p_0=0$. Note that for pure quaternions $p=-p^*$. The pure quaternions can be identified with 3 dimensional Euclidean space $E^3$ and this identification plays a role in the representation of the rotation group.

The norm of p is $N(p)=(p^*p)^{(1/2)}$, and p is called a unit quaternion if $N(p)=1$. It turns out that if p is a unit quaternion, then p can be expressed in the form $p=\cos(\theta)+a\sin(\theta)$, where a is a unit vector in $E^3$. It is also true that for unit quaternions, the linear transformation of $E^3$ defined by $$L_p(v)=pvp^*$$

is a rotation of the vector v through an angle $2\theta$ about the axis defined by a. Also the operator $L_p$ can be expressed as a matrix vector product $$L_p(v)=Rv$$

where the matrix R is given by $$R = \begin{bmatrix} 2p_0^2-1+2p_1^2 & 2p_1p_2-2p_0p_3 & 2p_1p_3+2p_0p_2 \\ 2p_1p_2+2p_0p_3 & 2p_0^2-1+2p_2^2 & 2p_2p_3-2p_0p_1 \\ 2p_1p_3-2p_0p_2 & 2p_2p_3+2p_0p_1 & 2p_0^2-1+2p_3^2 \end{bmatrix}$$

(3) Representation of SO(3) via Orthogonal Matrices

The group of orthogonal matrices is defined by the condition that the transpose of a matrix is equal to its inverse. Matrices are the standard and practical way of implementing linear operators. It should be noted that unlike the 6 redundant parameters in a general orthogonal matrix, the matrix R defined above has only one redundant parameter.

A mapping will now be developed from the Direct Representation to a set of matrices so that there are no redundant parameters. For the point with coordinates (u,v,w) for the Direct Representation, define the unit vector a by $$a = \frac{(u, v, w)}{[u^2 + v^2 + w^2]^{0.5}}$$

The magnitude of rotation about this axis is then given $\theta=[u^2+v^2+w^2]^{0.5}$. Now define the unit quaternion $$p=\cos(\theta/2)+a\sin(\theta/2)=p_0+p_1i+p_2j+p_3k.$$

The rotation matrix R constructed in this way using the matrix representation associated with the linear operator $L_p(v)=pvp^*$ will now have no free parameters.

Description of the Algorithm

Segment 1

In this sub-section a description of the iterative method for generating a self-consistent solution to the estimation of positional location is given. For simplicity of notation, the cluster is assumed to contain three units. Let $A_0$, $B_0$ and $C_0$ denote the ground truth positions of the 3 units and the GPS observed positions is denoted by A, B, and C. The 3 distances D(A,B), D(B,C) and D(A,C) associated with the GPS observations are inconsistent with the actual distances $D(A_0,B_0)$, $D(B_0,C_0)$ and $D(A_0,C_0)$ that are given by the more accurate distance measuring sensor.

Step 1.

Generate a new position A' of A that yields a better fit of the 3 distances D(A',B), D(B,C) and D(A',C) to the actual distances $D(A_0,B_0)$, $D(B_0,C_0)$ and $D(A_0,C_0)$. The measure of fit is the mean square error $$E=(D(A',B)-D(A_0,B_0))^2+(D(B,C)-D(B_0,C_0))^2+(D(A',C)-D(A_0,C_0))^2.$$

A minimization algorithm is used to position A' to minimize E.

Step 2.

With the new location of A', a new position B' of B is determined by the minimization of $$E=(D(A',B')-D(A_0,B_0))^2+(D(B',C)-D(B_0,C_0))^2+(D(A',C)-D(A_0,C_0))^2.$$

Step 3.

With the new locations of A' and B', a new position C' of C is determined by the minimization of $$E=(D(A',B')-D(A_0,B_0))^2+(D(B',C')-D(B_0,C_0))^2+(D(A',C')-D(A_0,C_0))^2.$$

Segments 1, 2 and 3 make up one cycle of the iteration algorithm. This process is repeated until convergence is obtained. It has been found that the corrections become small very quickly and only a few cycles are necessary to obtain effective convergence.

Segment 2

In this sub-section a description of the technique for improving the solution obtained by Segment 1 is given. Let $A^{(n)}$, $B^{(n)}$ and $C^{(n)}$ denote the final converged estimate of positions of units that are generated by this iterative process of Segment 1. The only direct positional knowledge of the location of the 3 units are the position vectors A, B and C that have been generated by GPS. The rigid body transformation of space that when applied that the 3 vectors $A^{(n)}$ $B^{(n)}$ and $C^{(n)}$ gives the best match to the 3 GPS position observations A, B and C is now computed. The objective function $$E=D(A^{(n)},A)+D(B^{(n)},B)+D(C^{(n)},C)$$

is minimized over the Euclidean group. If the underlying space is 2-dimensional, then a 3 parameter minimization is done. If the underlying space is 3-dimensional, then a 6 parameter minimization is done. The minimization of E averages the GPS errors over all units in the cluster.

The description of the algorithm has been in terms of a cluster of 3 units. The MATLAB code that implements the algorithm in software allows for an arbitrary number of units. If for a particular application translational errors are either not significant or can be eliminated relative to a unit leader, then a rigid body translation can be applied to all units in the cluster relative to the designated unit leader. For the MATLAB code the unit leader is selected as UAV(1). Minimization in the iterative process for Segment 1 and for determining the global Euclidean motion of Segment 2 was done using the MATLAB function fminsearch.

Computer Simulations

The algorithm that fuses GPS positional observations with a matrix of inter-distance measurements to improve the accuracy of position determination for a cluster of units has been implemented in software. MATLAB code has been developed for the 2-dimensional case where the cluster of units is constrained to move in a plane and for the 3-dimensional case where the units are able to move in space. Computer simulations in spaces of 2 and 3 dimensions demonstrate the utility of the algorithm in terms of smaller position errors relative to the initial set of GPS observations. The objective of these simulations is to demonstrate that relative to GPS estimation of position, a significant increase in accuracy is achieved.

Two Dimensional Geometry

Figure 3:
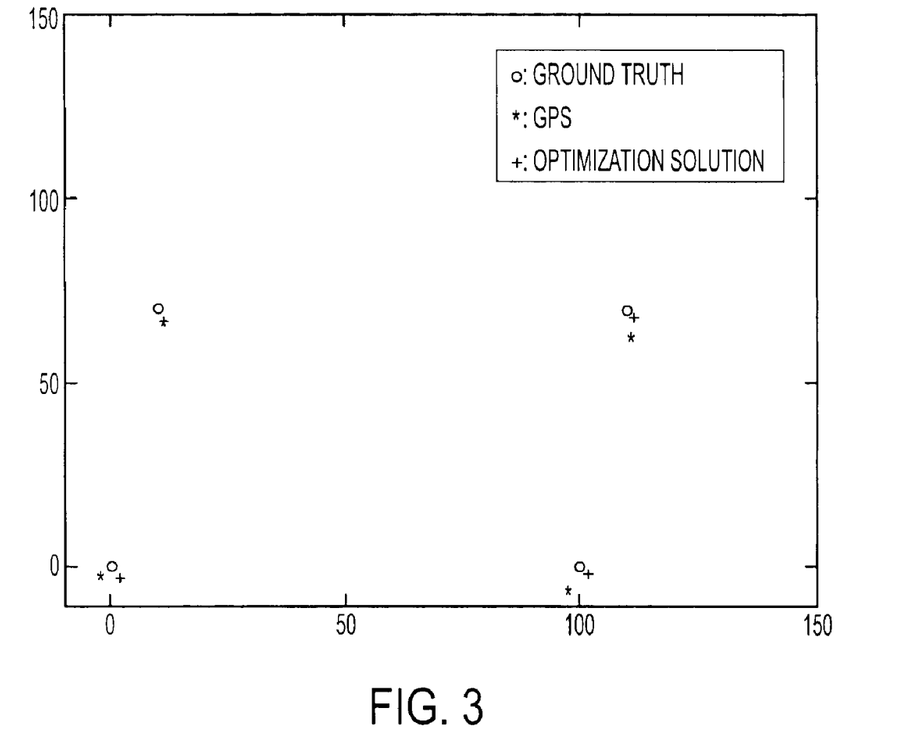
FIG. 3 is a positional plot of the results of applying the algorithm for a cluster of four units constrained to move in a horizontal plane according to the invention.

The first implementation of this algorithm in software is for a cluster of units constrained to move in a plane. Here the GPS observations are assumed to perturb the ground truth positions of the units by a two dimensional Gaussian random vector with equal standard deviation for both variables and the inter-distance measurements between units are assumed to have no error. These assumptions are not part of the algorithm and they are only used to measure performance when the ground truth is known. It is only important that the inter-distance measurements be more precise than the GPS observations. The first two examples are for a configuration of 4 units arranged along the vertices of a parallelogram. For the first example the translational error was not corrected for. This run took about ½ second of CPU time. The result is shown in FIG. 3 and it can be seen that optimization solution has a smaller average position error.

Figure 4:
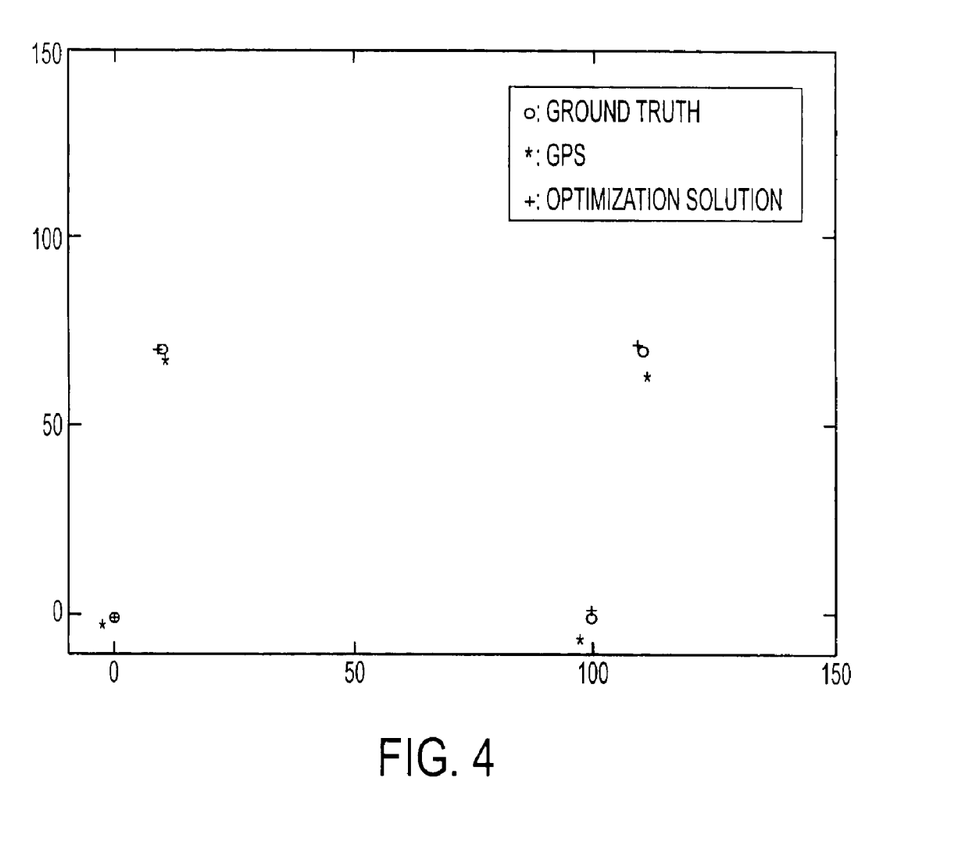
FIG. 4 is a positional plot of the results of applying the algorithm as in FIG. 3 where the residual translational error has been eliminated.

For the second example the translational error has been eliminated by plotting the results of the optimization algorithm relative to unit leader UAV_1 for the same observational data and this is shown in FIG. 4. For this example the RMS error is much less and it can be seen that there is still a small rotational error that is not corrected for.

These two plots with and without correction for the translational error are consistent with a number of examples obtained by varying the observational data via the random number seed. In order to compute the RMS error improvement obtained by this algorithm it is necessary to take the average over many runs. A plausible conjecture for the case where GPS errors are uncorrelated and the translational drift is not corrected for is that the RMS error will decrease with the square root of the number of units in the cluster.

For a system of N UAV's let the ground truth positional locations be P(k) and estimated locations be S(k) where k lies in the range 1 to N. Here P(k) and S(k) are position vectors in a space of 2 or 3 dimensions. The Euclidean distance between P(k) and S(k) is denoted by ||P(k)−S(k)|| and is computed is the square root of the sum of the squares of the components. The error between the ground truth and estimated positions is then defined by $$E = (1/N)\sum_{k=1}^{N} \|\underline{P}(k) - \underline{S}(k)\|$$

One thousand runs were used to estimate this error for the configuration of UAV's shown in FIG. 3 and the results are given as

| E1 | E2 | E3 | E4 |
|---|---|---|---|
| 6.33 | 5.32 | 3.96 | 2.51 |

Here

E1 is the initial error associated with the GPS observations.

E2 is the error before the Euclidean motion drift has been corrected for.

E3 is the error after the Euclidean motion drift has been corrected for.

E4 is the error after the translational drift term has been eliminated.

From the standpoint of evaluating the effectiveness of the algorithm for positional estimation of the UAV units, it is the comparison of E3 and E4 to E1 that is relevant.

There is some evidence that the there is correlation in the GPS position errors of nearby units. A correlation model of this effect yielded the result:

| E1 | E2 | E3 | E4 |
|---|---|---|---|
| 4.59 | 4.43 | 4.16 | 1.04 |

Three Dimensional Geometry

The second implementation of this algorithm in software is for a cluster of units free to move in 3-space. The GPS observations perturb the ground truth positions of the units by a three dimensional Gaussian random vector with equal standard deviation for each dimension and as for the two dimensional case, the inter-distance measurements between units are assumed to have no error. For the simulation example used to measure performance, a cluster of 8 units is assumed and they are taken to lie on the vertices of a cube. The error is computed exactly the same as for the two dimensional case via the formula:

$$E = (1/N)\sum_{k=1}^{N} \|\underline{P}(k) - \underline{S}(k)\|$$

where the 3 dimensional Euclidean distance metric is used.

Two simulation examples were used. In the first the GPS errors are uncorrelated and the standard deviation along each dimension was set equal to 1 meter. The results obtained are given by the table

| E1 | E2 | E3 | E4 |
|---|---|---|---|
| 1.61 | 1.12 | 0.88 | 0.79 |

In the second example the only change is that the GPS position errors are correlated and this has yielded

| E1 | E2 | E3 | E4 |
|---|---|---|---|
| 5.04 | 4.91 | 4.85 | 0.73 |

System 10 optionally includes a ground controller 20, for monitoring and/or controlling the flight and position of units 11 when these are drones or other types of unmanned aerial units. Controller 20 can also include a computer 22 capable of carrying out the inter-distance measurement algorithm either as a backup or as the primary processing instead of deploying the on-board unit 11 computers 18 described above.

While the present invention has been described in terms of a preferred embodiment, it is apparent that skilled artisans could make many alterations and modifications to such embodiments without departing from the teachings of the present invention. Accordingly, it is intended that all such alterations and modifications be included within the scope and spirit of the invention as defined in the following claims.

What is claimed as new and desired to be protected by Letters Patent of the United States is:

1. A cooperative engagement group-position determining system, comprising:
    a group of at least three cooperative units, wherein each said unit comprises:
    i) a GPS system for determining a GPS-based position;
    ii) an inter-distance measurement module for measuring a distance of the unit relative to at least one other unit; and
    iii) a computer including a computer-readable storage medium encoded with a program algorithm that includes instructions for correcting the GPS-based position based on at least one relative distance between two units to thereby provide an improved GPS-based position for the unit and for the group; and
    wherein the algorithm comprises an iterative process for i) generating a set of position vectors for each unit to thereby obtain a set of computed positional data and inter-distances for each unit and ii) minimizing a mean square error between the inter-distances and the GPS-based position, thereby correcting the GPS-based position and providing the improved GPS-based position, and repeating steps i) and ii) until a desired degree of convergence and a final converged estimate of positions of units is obtained, and wherein the GPS errors over all units in the cluster are averaged by applying a rigid body transformation of space to the final converged estimate of positions of units to thereby minimize an objective function of the type given by $E=D(A^{(n)}, A)+D(B^{(n)}, B)+D(C^{(n)}, C)$, where $A^{(n)}$, $B^{(n)}$ and $C^{(n)}$ are the final converged estimate of positions of units.

2. A group-position determining system as in claim 1, wherein the group has at least four cooperative units.

3. A group-position determining system as in claim 2, wherein the units are unmanned aerial vehicles (UAV's).

4. A group-position determining system as in claim 3, further comprising a ground controller for flight-controlling the UAV's.

5. A radar system, comprising:
    a plurality of at least four unmanned airborne platforms, each comprising:
    i) a synthetic aperture radar system configured to exchange radar data with at least one of the other unmanned airborne platforms;
    ii) an on-board GPS system for linking with a satellite-based GPS system to compute an individual GPS-based position;
    iii) an inter-distance computing module for measuring an inter-distance to at least one other platform; and
    iv) a computer including a computer-readable storage medium encoded with a program algorithm that includes instructions for a) applying the inter-distance measurement to at least one individual GPS-based position to thereby provide an improved GPS-based group position, and b) constructing an improved SAR radar image based on the improved GPS-based group position; and
    wherein the algorithm comprises an iterative process for i) generating a set of position vectors for each unit to thereby obtain a set of computed positional data and inter-distances for each unit and ii) minimizing a mean square error between the inter-distances and the GPS-based position, thereby correcting the GPS-based position and providing the improved GPS-based position, and repeating steps and ii) until a desired degree of convergence and a final converged estimate of positions of units is obtained, and wherein the GPS errors over all units in the cluster are averaged by applying a rigid body transformation of space to the final converged estimate of positions of units to thereby minimize an objective function of the type given by $E=D(A^{(n)}, A)+D(B^{(n)}, B)+D(C^{(n)}, C)$, where $A^{(n)}$, $B^{(n)}$ and $C^{(n)}$ are the final converged estimate of positions of units.

6. A radar system as in claim 5, wherein the unmanned airborne platforms are UAV's.

7. A radar system as in claim 6, further comprising a ground controller for flight-controlling the UAV's.

8. A method of correcting a GPS-based position for a cooperative engagement group, comprising:
    deploying a group of at least three cooperative units, wherein each said unit comprises:
    i) a GPS system for determining a GPS-based position;
    ii) an inter-distance measurement module for measuring a distance of the unit relative to at least one other unit; and
    iii) a computer including a computer-readable storage medium encoded with a program algorithm that includes instructions for correcting the GPS-based position based on at least one relative distance between two units; and
    wherein the algorithm comprises an iterative process for i) generating a set of position vectors for each unit to thereby obtain a set of computed positional data and inter-distances for each unit and ii) minimizing a mean square error between the inter-distances and the GPS-based position, thereby correcting the GPS-based position and providing the improved GPS-based position, and repeating steps i) and ii) until a desired degree of convergence and a final converged estimate of positions of units is obtained, and wherein the GPS errors over all units in the cluster are averaged by applying a rigid body transformation of space to the final converged estimate of positions of units to thereby minimize an objective function of the type given by $E=D(A^{(n)}, A)+D(B^{(n)}, B)+D(C^{(n)}, C)$, where $A^{(n)}$, $B^{(n)}$ and $C^{(n)}$ are the final converged estimate of positions of units;
    obtaining an initial GPS-based position for each of the units;

measuring an inter-distance between at least two of the units; and correcting the initial GPS-based position for each unit based on at least one relative distance between two units to thereby provide an improved GPS-based position for the unit and for the group.

9. A method as in claim 8, wherein the inter-distance is measured between each unit and each remaining unit and the GPS-based position is corrected based on all inter-distance measurements thus obtained.

10. A method as in claim 9, wherein each of the units is a UAV having an onboard SAR for obtaining an SAR radar image, and further comprising the step of constructing an improved SAR radar image based on the improved GPS-based group position.

11. A method as in claim 10, further comprising flight-controlling the UAV's using a ground control system.

* * * * *